United States Patent [19]

Tapply et al.

[11] 4,195,543
[45] Apr. 1, 1980

[54] BAND SAW

[75] Inventors: Warren J. Tapply, Fitchburg, Mass.; Garth L. Smith, Granby, Canada

[73] Assignee: Wallace Murray Canada Limited, Granby, Canada

[21] Appl. No.: 851,199

[22] Filed: Nov. 14, 1977

[30] Foreign Application Priority Data

Nov. 12, 1976 [CA] Canada .................................. 265537

[51] Int. Cl.² ........................................... B23D 55/08
[52] U.S. Cl. ...................................... 83/794; 83/820; 83/661; 83/847; 76/112
[58] Field of Search ................. 83/661, 835, 794, 820, 83/847, 651; 30/380; 125/18, 21

[56] References Cited

U.S. PATENT DOCUMENTS

| 1,850,478 | 3/1932 | Schaefer | 83/847 |
| 2,239,317 | 4/1941 | Gibb | 83/855 |
| 4,023,448 | 5/1977 | Bertini | 76/112 |
| 4,141,260 | 2/1979 | Bertini | 76/25 R |

FOREIGN PATENT DOCUMENTS

| 883602 | 10/1971 | Canada | 83/661 |
| 2110 | of 1883 | United Kingdom | 83/661 |

Primary Examiner—Othell M. Simpson
Assistant Examiner—Roscoe V. Parker
Attorney, Agent, or Firm—Robert E. Mitchell; Thomas J. Greer, Jr.

[57] ABSTRACT

An improved band saw blade for cutting hard ferrous or non-ferrous articles, wherein the band saw blade comprises an elongated, flexible, continuous ribbon having a back edge and a toothed edge, the ribbon having a sinoidal pattern in the plane of the ribbon, the wavelength and pitch of the ribbon being selected to enhance the cutting of the article but is selected to avoid chatter based on the rate of speed of travel of the ribbon, the pressure applied to the ribbon during the cutting and the average length of the cut to be made in the article to be cut. A method of constructing a band saw blade with a sinoidal pattern including the steps of successively squeezing portions of the saw blade or ribbon alternately near its back edge and near its toothed edge, whereby the blade is formed with a continuous wave pattern. An apparatus is also described for carrying out the method, wherein a pair of parallel drive shafts are mounted on a frame, the drive shafts each mounting arc segments spaced vertically and peripherally, the spacing between the corresponding segments as the drive shafts rotate being less than the thickness of the saw blade to be formed, and means for driving the drive shafts such that the segments contact and squeeze alternating parts of the saw blade as it passes between them.

6 Claims, 7 Drawing Figures

BAND SAW

BACKGROUND OF THE INVENTION

1. Field of the Invention

The present invention relates to a saw, and more particularly, to a band saw having a wave-like pattern.

2. Description of the Prior Art

The most widely used saws for cutting through ferrous or non-ferrous metal pieces are so-called band saws which include an endless saw blade looped about a pair of drive wheels on a movable head which is adapted to cut through the metal piece in a plane from above. Other types of metal cutting saws include reciprocating hack saws which similarly include a saw blade fixed to a reciprocating bracket on a movable head and is adapted to cut through the metal piece through a predetermined plane.

We are aware of the following prior art which relates to band saws having curved or wave-like patterns:

U.S. Pat. No. 286,706, Kay, 1883, shows a band saw having a scalloped or wave-like cutting pattern but without teeth. The wave or scalloped sharpened edges are readly the teeth in a saw.

U.S. Pat. No. 817,361, Brown et al, 1906, shows a hand saw with cutting teeth along one edge, the cutting teeth following a wave-like pattern. The hand saw is, of course, for use with soft materials such as wood, and following the developments which were made with bread knives, it is evident that a wave-like pattern along the cutting edge would be of some benefit in the cutting of soft material.

U.S. Pat. No. 1,850,478, Schaefer, 1932, shows a continuous band saw for use in soft materials, such as meats, whereby a wave-like pattern in the saw blade is provided. The wavelengths of the Schaefer saw are approximately ¾ of an inch from crest to crest.

Canadian Pat. No. 883,602, Amada, 1971, shows a band saw blade having alternating, concavely curved, soft portions of a band saw, and convexly curved hard portions, whereby the protruding hard portion does the actual cutting while the softer portion acts as a guide. The wavelength of the cutting edge, although not described in the Amada Canadian patent, is not believed to be greater than approximately 1 inch, judging from the scale of the drawings.

The various band saws known which have a wave-like pattern are, as described above, of very short wavelength and used especially for cutting of soft materials. In the art of cutting very hard materials, such as high hardness alloy steels, it is a basic rule that the band saw must be as straight as possible. Any "dog legs" which might be formed in a band saw during the manufacture thereof is an immediate cause of rejection of the band saw as unacceptable for use in cutting of hard steels.

It is also considered that the use of a band saw in cutting alloy steels having a wavelength similar to that shown in the Schaefer patent mentioned above or the Amada patent, would cause chattering which, of course, would result in immediate breakage of teeth in the saw.

SUMMARY OF THE INVENTION

It is an aim of the present invention to provide a band saw of improved sawing and wearing efficiency.

It is a further aim of the present invention to provide a band saw with a wave pattern therein for use in cutting hard metal workpieces which would have some of the advantages of the wave-type saws used for cutting softer material but would not be subject to chatter when running at high speeds and which would have superior cutting and wearing capabilities compared to a straight saw.

It is also an aim of the present invention to provide an improved method and apparatus for providing a wave pattern in a band saw blade. It is a still further aim of the present invention to provide an improved method for making a band saw with a wave pattern.

A band saw in accordance with the present invention for use on a band saw with pressure feed comprises an elongated, flexible, continuous ribbon having a back edge and a toothed edge, the ribbon having a sinusoidal pattern in the plane of the ribbon, the wave length and pitch of the ribbon being selected to avoid chatter based on the speed of travel of the ribbon, the pressure applied to the ribbon and the average length of the cut to be made in the workpiece to be cut.

An apparatus in accordance with the present invention includes a frame, a pair of parallel drive shafts mounted on the frame, the drive shafts each mounting arc segments spaced vertically and peripherally, the spacing between the corresponding segments as the drive shafts rotate being less than the thickness of the saw blade to be formed, means for driving the drive shafts such that the segments contact and squeeze alternating parts of the saw blade as it passes between them.

A method in accordance with the present invention includes squeezing successive portions of the saw blade alternately near its back edge and near its toothed edge continuously, whereby the blade is formed having a wave pattern.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENT

Figure 1:
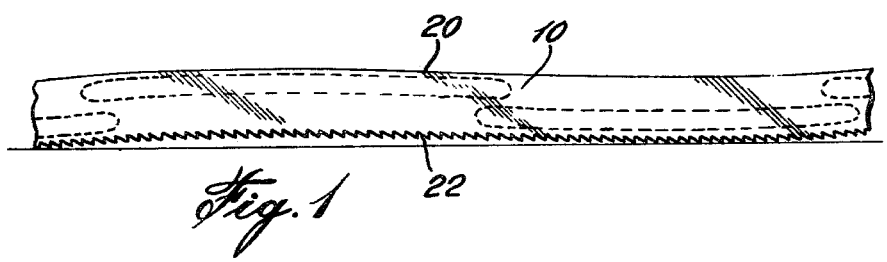
FIG. 1 is a fragmentary side elevation of a saw blade in accordance with the present invention.
Figure 2:
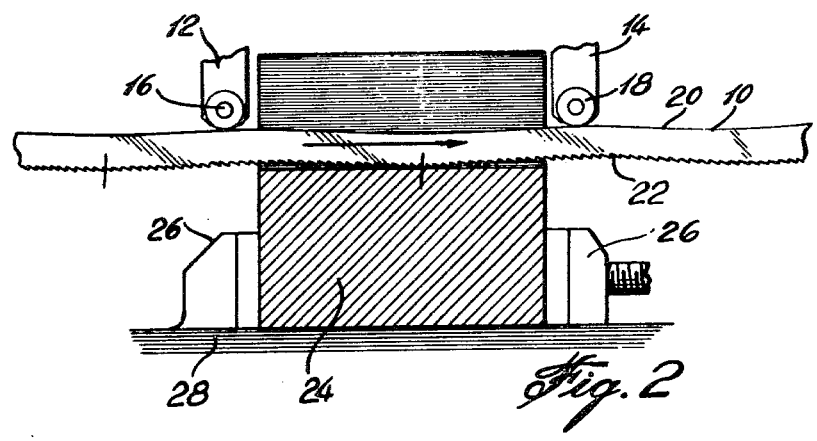
FIG. 2 is a schematic fragmentary elevation view showing a saw blade in operation in a band saw machine.

Referring now to the drawings and particularly to FIGS. 1 and 2, there is shown a typical band saw 10 which has a wave-like curve formed therein such that the toothed edge 22 and back edge 20 has a sinoidal outline.

In FIG. 2, there is shown the band saw 10 set up in a band saw head represented by the guide arms 12 and 14 mounting guide wheels 16 and 18 and pressing on the back edge 20 of the blade 10. The saw toothed edge 22 engages the workpiece 24 with the edge 22 always at an angle to the cut being formed in the workpiece. The workpiece in the drawing is being held by a vice 26 on a frame 28.

The wave length and pitch of the saw blade can vary. It is believed that this wavelength can vary anywhere from 10" in length to more than 17". The following are examples of tests which have been carried out with saw blades having a wavelength of approximately 12", i.e., from crest to crest on the toothed edge 22.

EXAMPLE I

The saw blades used were normally endless band saw blades and the cutting machine was a DoAll cut-off machine. In the tests, the band saw was a regular hardened carbon band saw 12 feet in length by 1 inch with 8 teeth per inch.

| | |
|---|---|
| Wavelength | 12" |
| Pitch | .010" to .020" |
| Workpiece | 5" diameter cold rolled |
| Speed | 150 feet per minute |
| Head pressure | 2½ on DoAll machine dial |
| Number of cuts | 10 |
| Average time | 8 minutes 20 seconds |

Comparative tests with a conventional straight blade at the same speed and pressure setting:

| | |
|---|---|
| Number of cuts | 10 |
| Average cut per minute | 10 minutes, 45 seconds |

It is noted that after 10 cuts, the blade with the wave formation revealed less wear than the straight blade.

EXAMPLE II

A further test was made having an endless band saw blade of 12 feet by 1 inch with 4 teeth per inch. Three blades were used of the same size and material with band A being a conventional straight blade while the other two bands B and C were curved. The machine used was a DoAll band saw machine, while a 12 inch diameter D-2 steel workpiece was used as a test piece for all three tests. The band speed was set at 120 feet per minute and head pressure at 3 on a DoAll dial.

| Band A | |
|---|---|
| Pitch | straight blade |
| First cut time | 62 minutes |
| Second cut | 63 minutes |
| Band B | |
| Pitch | .010" to .015" |
| Wavelength | 12" |
| First cut | 50 minutes |
| Second cut | 55 minutes |
| Band C | |
| Pitch | 20" to .030" |
| Wavelength | 12" |
| First cut | 45 minutes |
| Second cut | 46 minutes |

All three bands were examined with a microscope following the cutting tests to determine the amount of water. All three bands revealed little, if no wear. The cutting chips were examined, and the straight band chips were considerably smaller and had a high percentage of dust particles while both blades B and C had a heavier and better chip.

EXAMPLE III

Three further blades were tested:

Blade A—12 feet by 1 inch, straight blade.

Blade B—12 feet by 1 inch, having a wavelength of 12 inches, and a pitch of 0.020" to 0.030".

Blade C—2 week-old blade having a wavelength of 12 inches and a pitch of 0.010" to 0.020".

The machine used in this test was a DoAll cut-off machine. The speed of the blade was set at 150 feet per minute, and the head pressure on the DoAll scale was 2½. The workpiece was selected from an M-2 bar stock of 6¼ inch diameter.

| | |
|---|---|
| Blade A | |
| First cut time | 12 minutes, 5 seconds |
| Second cut | 14 minutes |
| Blade B | |
| First and only cut | 8 minutes |
| Blade C | |
| First cut | 11 minutes |

| | TESTS | | | | | | | | | |
|---|---|---|---|---|---|---|---|---|---|---|
| | 1 | 2 | 3 | 4 | 5 | 6 | 7 | 8 | 9 | 10 |
| Distance of Guide Posts | | | | | | | 9" | 6"12¼"11" | 12" | |
| Speed ft./min. | 150 | 120 | 120 | 140 | 150 | 150 | 150 | 150 | 150 | 150 |
| Wavelength | 12" | 12" | 12" | 12" | 12" | 6" | 14" | 14" | 14" | 14" |
| Pitch | .010–.020 | .010–.015 | .020–.030 | .020–.030 | .020–.030 | .030–.040 | .040–.045 | .040–.045 | .040–.045 | .040–.045 |
| Head Pressure | 2½ | 3 | 3 | 2½ | 2½ | 2½ | 2½ | 2½ | 2½ | 2½ |
| Size of Piece | 5" Steel | 12" D-2 Steel | 12" | 12⅛" D-2 Steel | 5¼" × 8¼" No. 176 Chipper | 6¼" M-2 | 5⅛" | 5⅛" | 5⅛" | 5⅛" |
| Time with Wave Curve Band Saw | 8 min. 20 sec. | 50 min. | 45 min. | 46 min. | 12 min. | 9 min. | 5 min. 5 sec. | 5 min. 15 sec. | 4 min. 35 sec. | 4 min. 22 sec. |
| Time with Straight Band Saw | 10 min. 45 sec. | 62 min. | 62 min. | | | 12 min. 5 sec. | | | | |

Following the preceding chart, it can be seen that a band saw with a sinoidal wave is superior in terms of cutting through hard steel than a straight edge blade. A conservative estimate could be used to predict that a band saw having a sinoidal wave pattern in accordance with the present invention will reduce the time to cut a given workpiece by 25%. The experiments which have been carried out as described herein and in accordance with other tests made, bear out that the band saw with the sinoidal wave pattern lasts longer than a comparable straight edge blade.

It is also noted that, although the Schaefer U.S. Pat. No. 1,850,478 describes a curved blade, it has a wavelength of ¾" which might be useful in sawing such soft materials as meat; it would, however, only provoke chatter and vibrations in the saw equipment in the applications to which the present band saw is to be used. It has been determined by tests that the shorter the wavelength, that is, under 10 inches, and certainly under 6 inches, the higher the probability of obtaining vibrations sufficient to cause breakage of teeth in the saw. As to the maximum wavelength, it is noted that although the size of the workpiece has some influence on the selection of the wavelength, wavelengths over 24 inches showed little improvement over straight edge blades. For normal industrial usage, that is, in using horizontal (gravity feed, hydraulic release) or vertical (positive hydraulic feed with spring-mounted guide arms) band saws operating in the area of 100 feet per minute to 150 feet per minute and used for cutting workpieces between 5 inches in width or diameter and 12 inches in width or diameter made of cold rolled steel or of harder alloy steels, the following ranges are acceptable:

| | |
|---|---|
| Wavelength from crest to crest | 6 inches to 24 inches, but preferably between 10 inches to 17 inches |
| Pitch | .010" to .050", but preferably between .020" and .040" |

In selecting the proper wavelength and pitch, the following criteria should be considered, keeping in mind, of course, that there are a limited number of standard band saw machines so that the variety of band saws which must be designed is reasonably limited:

Type of Band Saw

If the band saw is a horizontal band saw with a gravity feed, hydraulic release, the probability of causing vibrations is greater, depending on the average speeds on which the band saws will be run. It is also noted that by selecting the right wavelength, the head of the saw actually enhances the cutting since the frequency of vibration of the head can be harmonically similar to the wavelength of the band and, therefore, the head will be pressing on the band at the same position of successive waves, such as when the upward slope of a curve is passing through a working piece. It is believed that with the hydraulic feed band saws, such as vertical band saws, such an effect is less critical since the reaction of the back edge of the band saw on the band saw machine is absorbed by dampers or springs provided in the guide arms.

Space Between the Guide Arms

As noted in the preceding table, experiments have been made with the spacing of the guide arms, and it would appear that, depending on the wavelength of the band saw, the guide arms should be arranged to approximately the distance of one (1) wavelength.

Size of Workpiece

As noted above, the size of the workpiece has some bearing on the length of wavelength to be chosen for cutting pieces although the length of the wavelength of the band saw in relation to the workpiece will merely increase the efficiency of the band saw but not render it necessarily inoperable if the wrong wavelength is chosen. It would appear from tests that the most efficient selection is to have the wavelength twice the length of the average diameter or width of the workpiece. This, of course, does not seem to hold true with larger workpieces where the efficiency of the band saw appears to taper off at average speeds when the wavelength is greater than 17 inches and certainly greater than 24 inches.

Speed of Band Saw

Of course, the speed at which the band saw is operated will have an influence on the wavelength of the band saw selected since, of course, the slower the speed, the shorter the wavelength which may be acceptable. However, since industrial cutting machines appear to operate in the range of 100 to 150 ft./min. satisfactorily, the range of between 10 to 17 inches as the length for the wavelength is suitable. It has been discovered, however, that the effectiveness of the sinoidal-curve band saw will diminsh and cause chatter even at lower speeds when the wavelength is less than 10 inches and certainly below approximately 6 inches.

Figure 6:
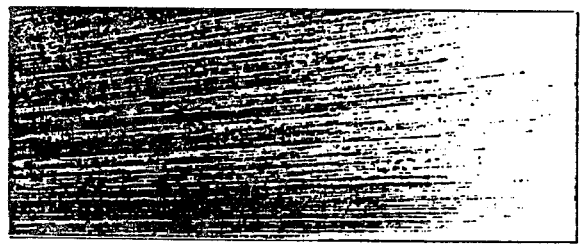
FIG. 6 is a photograph of a workpiece cut by a conventional straight saw blade.
Figure 7:
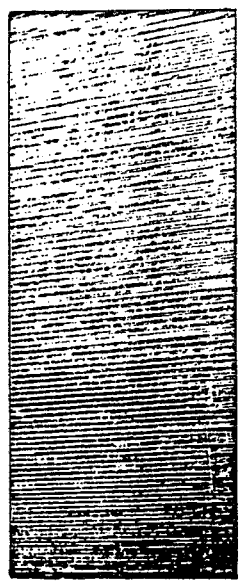
FIG. 7 is a photograph of a workpiece cut by a wave form saw blade.

Referring to FIGS. 6 and 7, there is shown photographs of two pieces of Monel steel. The photograph in FIG. 6 illustrates the appearance of the cut face of a block of Monel cut by a straight edge blade. The photograph of FIG. 7 illustrates the cutting face of a block cut by a sinoidal curved blade in accordance with the present invention. A comparison of both photographs shows the difference in depth of cuts, with FIG. 7 showing the much deeper cuts made by the curved blade as compared to the rather shallow cuts of the straight edge band saw blade shown in FIG. 6. It is also noted that the straight edge band saw blade tends to polish the surface which, of course, is inefficient and increases wear of the blade.

Figure 3:
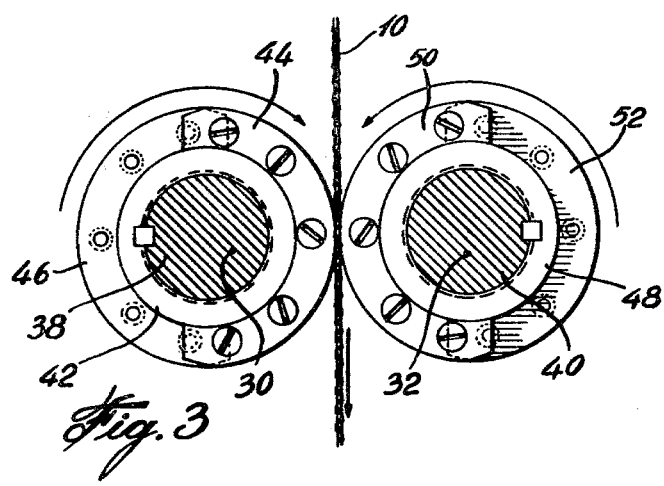
FIG. 3 is a top view showing a detail of the apparatus for forming the wave form in the saw blade.
Figure 4:
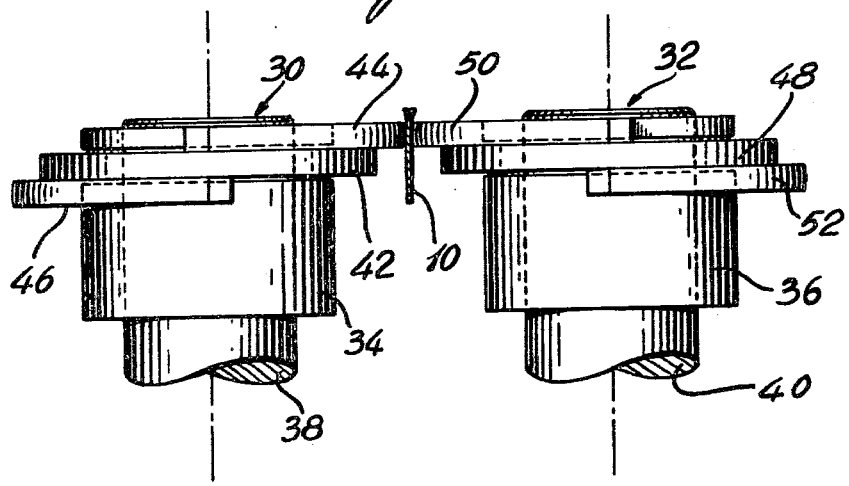
FIG. 4 is a fragmentary side elevation of the apparatus of FIG. 3 in an operative position.
Figure 5:
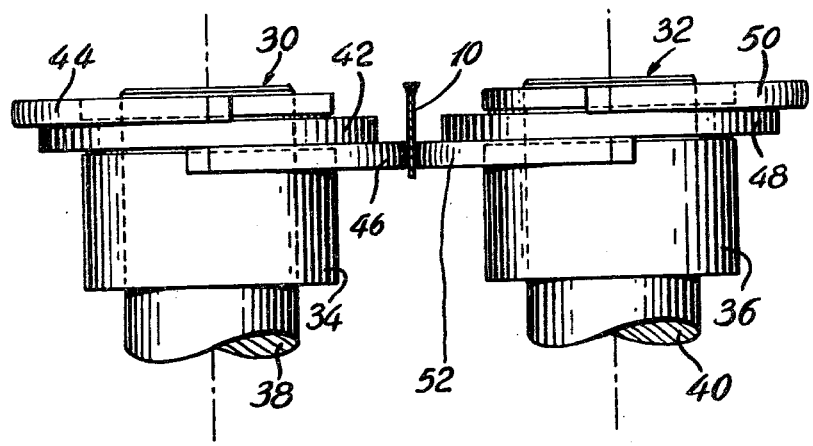
FIG. 5 is a side elevation of the apparatus of FIGS. 3 and 4 but in a different operative position.

In order to produce the blade with a wave pattern, it is contemplated that a straight blade be made in the conventional manner and then be passed between a pair of segmented rollers 30 and 32 shown in FIGS. 3 to 5. Each roller 30 and 32 includes a collar 34 and 36 respectively mounted to respective drive shafts 38 and 40.

The collar 34 has a mounting flange 42 on which is mounted a first arc segment 44 and a second arc segment 46. Both segments are approximately semi-circular but may be tapered off towards each end of the segment in order to produce different wave curves in the blade. The segments should overlap approximately ⅛". Similarly, the roller 32 has a mounting flange 48 on which is mounted a half arc segment 50 and a half arc segment 52.

The segments 44, 46, 50 and 52 are mounted on the respective rollers 30 and 32 such that they correspond with each other when the shafts 38 and 40 are turning, as shown in FIGS. 3 to 5. The distance between two corresponding segments is slightly less than the thickness of the conventional straight saw blade and can be set depending on the different widths of saw blades.

As the saw blade is passed between segments 44 and 50, the material is squeezed near the tooth edge 22, forcing the blade to curve downwardly. As the saw blade 10 progresses between the rollers, the segments 44 and 50 disengage the saw blade, as it is then engaged by the segments 46 and 52 which successively pinch the blade in an area closer to the back edge 20, forcing the blade in that area to curve upwardly completing a wavelength.

We claim:

1. A band saw for cutting hard metals comprising an elongated ribbon adapted to be used on a band saw machine with pressure feed, the machine includes a workpiece holder, a movable band saw head, said ribbon being mounted for sawing movement on said head, the ribbon including a back edge and a toothed edge, the ribbon having a sinoidal wave pattern in the plane of the ribbon and provided continuously, the wavelength of the wave pattern being selected in the range of 6 inches to 24 inches with a pitch selected in the range of 0.010" to 0.050", the head including means for applying pressure to the back edge of the ribbon, the wavelength and the pitch of the ribbon being such as to avoid chatter based on the speed of travel of the ribbon, the pressure applied to the back edge of the ribbon during the cutting and the average length of the cut to be made in the workpiece to be cut while providing a more efficient cut through the workpiece.

2. A band saw as defined in claim 1 wherein said means carried by the head for applying pressure includes at least a pair of guide arms coacting with the back edge of the ribbon and spaced apart a distance equal to one wavelength of the ribbon.

3. A band saw as defined in claim 1, wherein the wavelength is in the range of 10" to 17" from crest to crest and the pitch of the wave is in the range of 0.020" to 0.040".

4. A band saw as defined in claim 3, wherein the wavelength is in the range of 12" to 14" and the pitch of the wave is in the range of 0.020" to 0.040".

5. A band saw as defined in claim 3, wherein the ribbon is made from a regular hardened carbon band saw 12' in length by 1" in width with a tooth count of 8 teeth per inch.

6. A band saw as defined in claim 1, wherein the band saw is a continuous ribbon having a continuous regular wave pattern having a wavelength in the range of 10" to 17" with a pitch in the range of 0.010" to 0.040" for use on a horizontal band saw having a head pressure adjusted to $2\frac{1}{2}$ and a band speed of between 100 feet per minute and 150 feet per minute for cutting hard steel articles ranging from 5 inches in diameter or width to 12 inches in diameter or width.

* * * * *